United States Patent
Zhang et al.

(10) Patent No.: US 10,322,703 B2
(45) Date of Patent: Jun. 18, 2019

(54) SYSTEMS FOR INTEGRATING CAMERA CLEANING AND DOOR/TRUNK ACCESS FOR A VEHICLE

(71) Applicant: GM Global Technology Operations LLC, Detroit, MI (US)

(72) Inventors: Wende Zhang, Troy, MI (US); Timothy J. Canner, Malcomb, MI (US); Esther Anderson, Canton, MI (US); Alma Bushi, Rochester Hills, MI (US); Gary V. Bandurski, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 393 days.

(21) Appl. No.: 15/181,796

(22) Filed: Jun. 14, 2016

(65) Prior Publication Data
US 2017/0297540 A1    Oct. 19, 2017

Related U.S. Application Data

(60) Provisional application No. 62/323,011, filed on Apr. 15, 2016.

(51) Int. Cl.
| | | |
|---|---|---|
| *B60S 1/56* | (2006.01) | |
| *B60S 3/04* | (2006.01) | |
| *B08B 1/00* | (2006.01) | |
| *B60R 11/00* | (2006.01) | |

(Continued)

(52) U.S. Cl.
CPC ............. *B60S 3/04* (2013.01); *B60R 11/04* (2013.01); *B60S 1/566* (2013.01); *G02B 27/0006* (2013.01); *B08B 1/002* (2013.01); *B60R 2011/004* (2013.01)

(58) Field of Classification Search
CPC ........ B60S 1/566; B60R 11/04; G02B 27/0006
See application file for complete search history.

(56) References Cited

U.S. PATENT DOCUMENTS

| | | | |
|---|---|---|---|
| 6,058,553 | A | 5/2000 | Tsuyama et al. |
| 7,916,005 | B2 | 3/2011 | Nakane |
| 9,162,685 | B2 | 10/2015 | Schindler et al. |

(Continued)

FOREIGN PATENT DOCUMENTS

| | | |
|---|---|---|
| CN | 1664290 A | 9/2005 |
| CN | 1860050 A | 11/2006 |

(Continued)

OTHER PUBLICATIONS

DE102005021672A1 (machine translation) (Year: 2006).*

(Continued)

*Primary Examiner* — Andrew A Horton

(57) ABSTRACT

A camera cleaning system for a vehicle includes a camera including a lens cover and a motor. A cleaning assembly includes an arm including a cleaning material. The motor selectively adjusts a position of the arm and the cleaning material relative to the lens cover of the camera. The motor selectively adjusts a position of the arm and the cleaning material relative to vehicle from a first position to a second position. The camera selectively generates video signals when the camera is in the first position. The cleaning assembly is in contact with the lens cover when the camera is in the second position.

12 Claims, 9 Drawing Sheets

(51) Int. Cl.
*B60R 11/04* (2006.01)
*G02B 27/00* (2006.01)

(56) References Cited

U.S. PATENT DOCUMENTS

| | | | |
|---|---|---|---|
| 9,180,840 B2 | 11/2015 | Tanaka et al. | |
| 9,205,806 B2 | 12/2015 | Gunter | |
| 9,645,392 B2 | 5/2017 | Yoshimura | |
| 2002/0152010 A1* | 10/2002 | Colmenarez | B60R 25/2045 |
| | | | 701/36 |
| 2005/0193212 A1 | 9/2005 | Yuhara | |
| 2010/0141412 A1* | 6/2010 | Partin | G08G 1/205 |
| | | | 340/426.18 |
| 2011/0181725 A1 | 7/2011 | Matsuura et al. | |
| 2013/0255023 A1 | 10/2013 | Kikuta et al. | |
| 2014/0207344 A1* | 7/2014 | Ihlenburg | E05F 15/73 |
| | | | 701/49 |
| 2014/0320654 A1* | 10/2014 | Dadeppo | G02B 27/0006 |
| | | | 348/148 |

FOREIGN PATENT DOCUMENTS

| | | |
|---|---|---|
| CN | 103043035 A | 4/2013 |
| CN | 103648853 A | 3/2014 |
| CN | 103929575 A | 7/2014 |
| CN | 104276134 A | 1/2015 |
| CN | 204104017 U | 1/2015 |
| CN | 204669485 U | 9/2015 |
| CN | 204974543 U | 1/2016 |
| DE | 102005021672 A1 | 11/2006 |

OTHER PUBLICATIONS

U.S. Appl. No. 15/181,759, filed Jun. 14, 2016, Zhang et al.
First Office Action for Chinese Application No. 201710173363.9 dated Oct. 12, 2018; 8 pages.

* cited by examiner

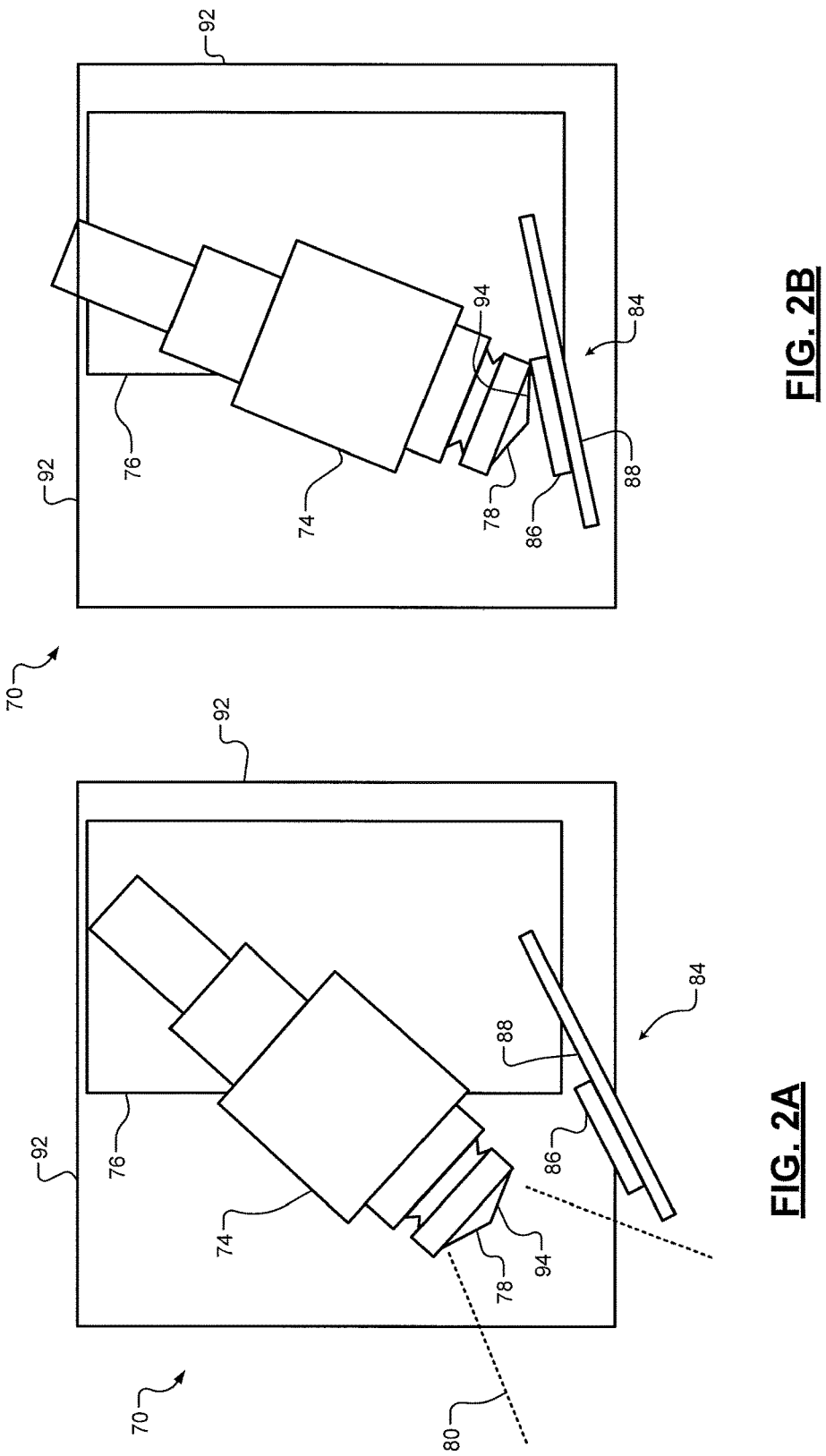

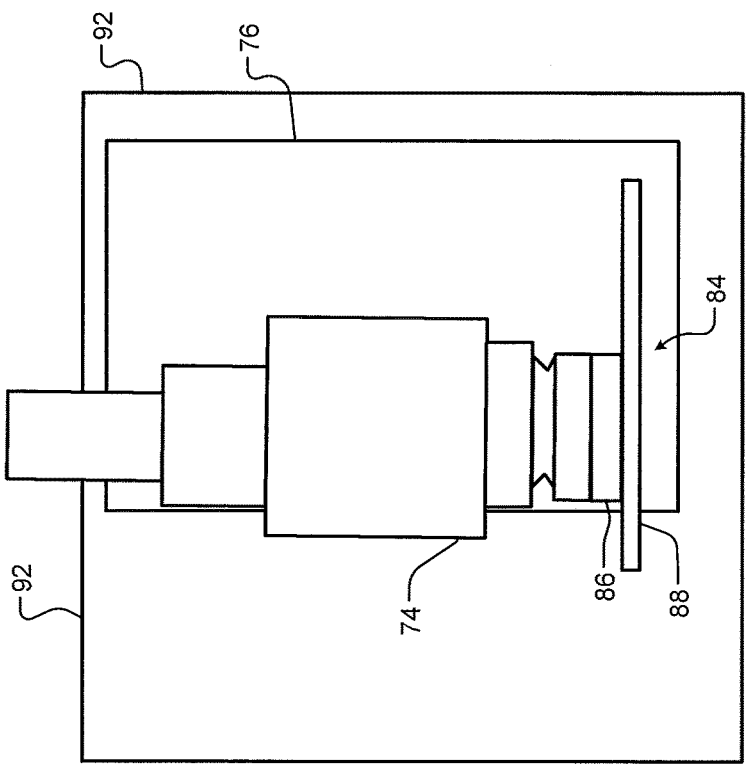
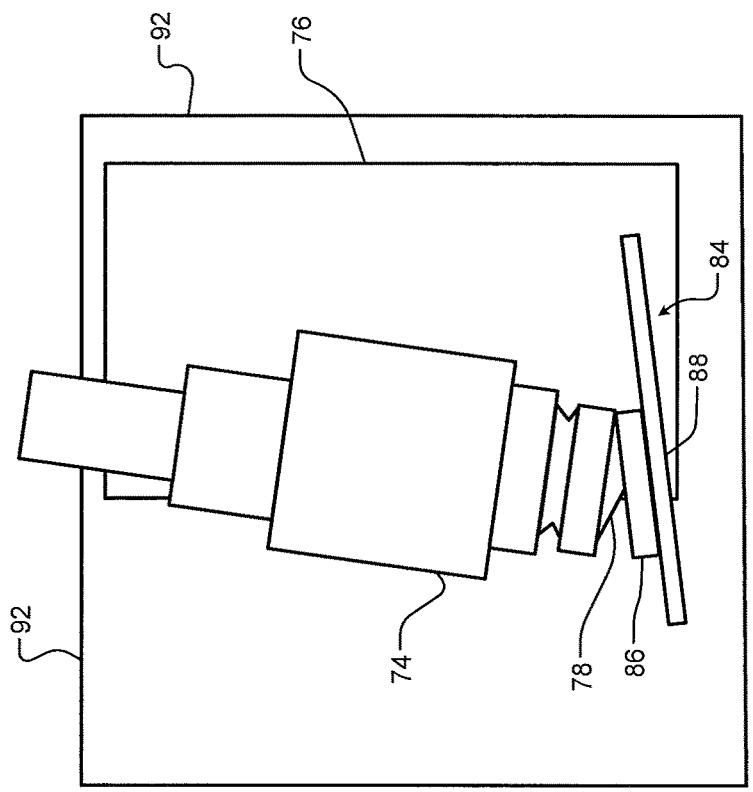

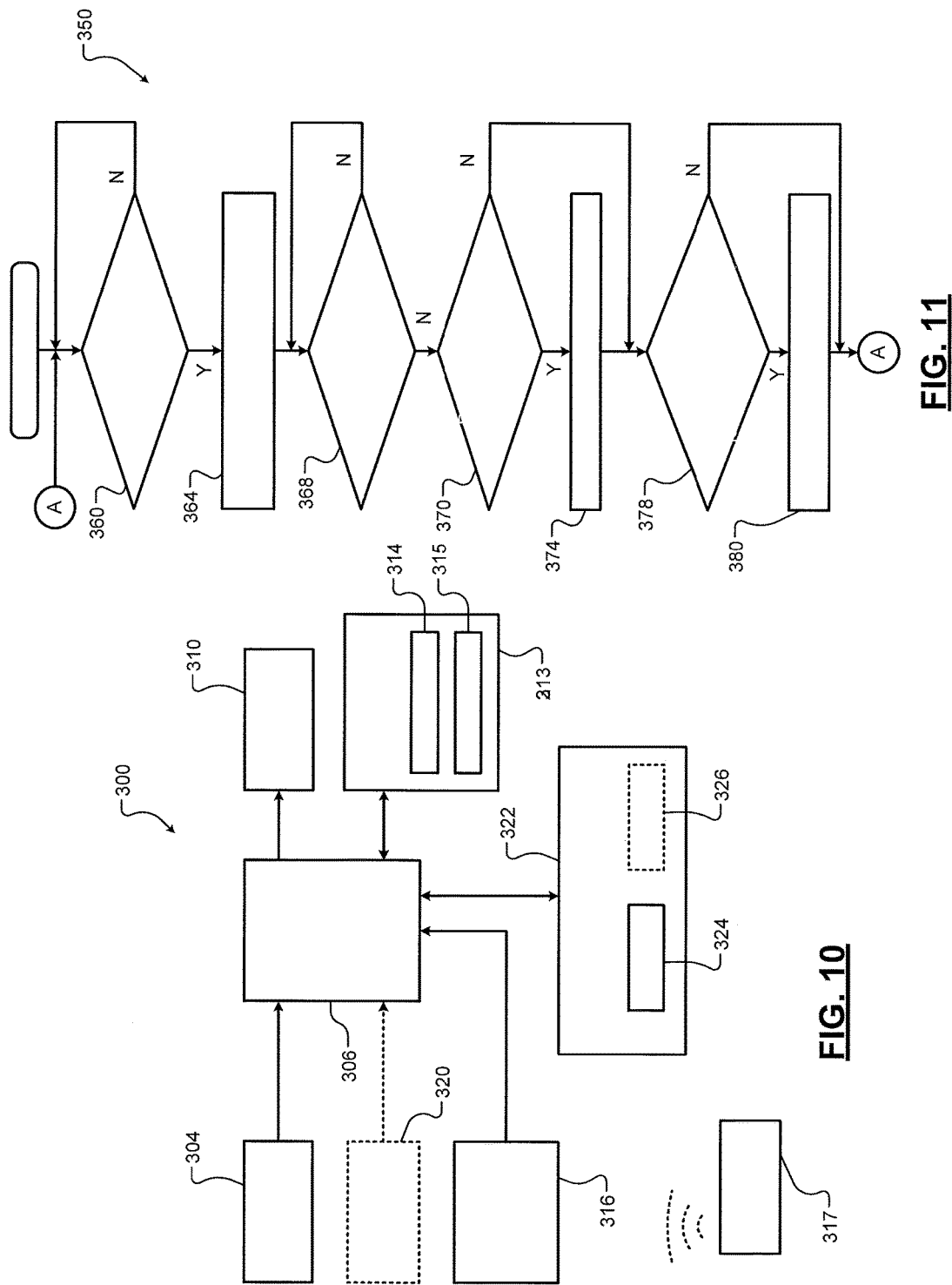

SYSTEMS FOR INTEGRATING CAMERA CLEANING AND DOOR/TRUNK ACCESS FOR A VEHICLE

CROSS-REFERENCE TO RELATED APPLICATIONS

This application claims the benefit of U.S. Provisional Application No. 62/323,011, filed on Apr. 15, 2016. The entire disclosure of the application referenced above is incorporated herein by reference.

This application is related to U.S. patent application Ser. No. 15/181,759, filed on Jun. 14, 2016. The entire disclosure of the application referenced above is incorporated herein by reference.

FIELD

The present disclosure relates to vehicles with cameras, and more particularly to systems and methods for integrating camera cleaning and/or door/trunk access for a vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles may include a rear view camera that is attached to a trunk or lift gate of a vehicle and that is directed in a rearward direction. The rear view camera provides a view to assist a driver when the vehicle is travelling in reverse. The rear view camera also helps to reduce rear blind spots.

SUMMARY

A camera cleaning system for a vehicle includes a camera including a lens cover and a motor. A cleaning assembly comprises an arm including a cleaning material. The motor selectively adjusts a position of the arm and the cleaning material relative to vehicle from a first position to a second position. The lens cover is at least partially exposed when the camera is in the first position. The cleaning assembly is in contact with the lens cover when the camera is in the second position.

In other features, the motor moves the cleaning material across the lens cover as the camera and the cleaning assembly move from a first position to a second position. The motor rotates the camera when moving from the first position to the second position. The cleaning material is arranged in contact with the lens cover when the camera is located in the second position.

In other features, a field of view of the camera is unobstructed when the camera is in the first position. The motor is attached to a vehicle component selected from a group consisting of a door, a side mirror, a trunk and a lift gate of a vehicle.

In other features, a video processing module performs video processing of video images from the camera and selectively actuates at least one of the motor based on the video processing. The video processing module performs gesture identification to determine whether the video images include a predetermined gesture and at least one of selectively actuates the motor based on a result of the gesture identification, and/or selectively opens or closes the vehicle component based on a result of the gesture identification.

In other features, the video processing module performs biometric identification to determine whether the video images include a predetermined biometric characteristic and at least one of selectively actuates the motor based on a result of the biometric identification, and/or selectively opens or closes the vehicle component based on a result of the biometric identification.

A vehicle includes the camera cleaning system, a key authentication system, and a control module that selectively moves the camera from the second position to the first position in response to the key authentication system sensing a key fob or smartphone that is paired with the vehicle.

In other features, the lens cover includes a hydrophobic coating.

A camera cleaning system for a vehicle includes a camera including a lens cover. A mounting device mounts the camera to a moveable vehicle component. A cleaning assembly includes a spring member and a cleaning material. At least one of opening movement and closing movement of the moveable vehicle component causes the spring member to move the cleaning material across the lens cover of the camera.

In other features, the spring member includes first and second springs connected to the moveable vehicle component. The cleaning assembly includes an arm having opposite ends connected to the first and second springs. The cleaning material is integrated with or arranged on at least one side of the arm. Movement of the moveable vehicle component causes the springs of the cleaning assembly to move the cleaning material across the lens cover of the camera.

In other features, the cleaning assembly includes an arm having one end rotatably connected to the moveable vehicle component. The cleaning material is integrated with or arranged on at least one side of the arm. The spring member biases the arm in a first rotational direction. Movement of the moveable vehicle component causes the arm of the cleaning assembly to rotate to move the cleaning material across the lens cover of the camera.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 2A-2D are side views illustrating an example of a camera cleaning system including a camera and a cleaning arm assembly that are positioned by a motor according to the present disclosure;

FIG. 10 is a functional block diagram illustrating another example of a control system for the camera cleaning system;

FIG. 11 is a flowchart illustrating an example of a method for operating the camera cleaning system of FIG. 10.

In the drawings, reference numbers may be reused to identify similar and/or identical elements.

DETAILED DESCRIPTION

Systems and methods according to the present disclosure integrate and simplify camera cleaning and/or door/trunk/lift gate access functions to reduce cost, to improve functionality, and to increase customer satisfaction. In some examples, the washer nozzle associated with the camera is eliminated and replaced by a motor-actuated or spring-actuated cleaning arm that removes debris from the surface of the lens of the camera. The spring-actuated cleaning arm cleans the lens cover when a position of a moveable vehicle component (such as a door, trunk, hood or lift gate) is changed (such as opened or closed). In other examples, a motor is used to initiate cleaning of the lens cover of the camera.

In some examples, gesture or biometric identification systems are used to actuate the moveable vehicle component and/or to actuate a motor that moves cleaning arms to clean the lens cover of the camera based upon predetermined gestures or biometric characteristics of the vehicle owner. While the foregoing description is described using a rear video camera, the present disclosure applies to other cameras (such as side view or front view cameras) that may be associated with a vehicle.

Rear view cameras may be connected to an integrated center stack (ICS) or display or integrated with a rear view mirror. The rear view camera may be enabled when the driver selects reverse using a transmission gear selector such as a PRNDL lever or manual stick shift.

The image output by the rear view camera is horizontally flipped so that the output is a mirror image. The mirrored image makes the orientation of the display consistent with physical mirrors installed on the vehicle. The rear view camera typically includes a wide-angle or fisheye lens. While the lens prevents the ability to see faraway objects clearly, it allows the rear view camera to display an uninterrupted horizontal view from one rear corner of the vehicle to the other. The rear view camera is typically pointed at a downward angle rather than straight back to allow the driver to view obstacles on the ground.

Figure 1:
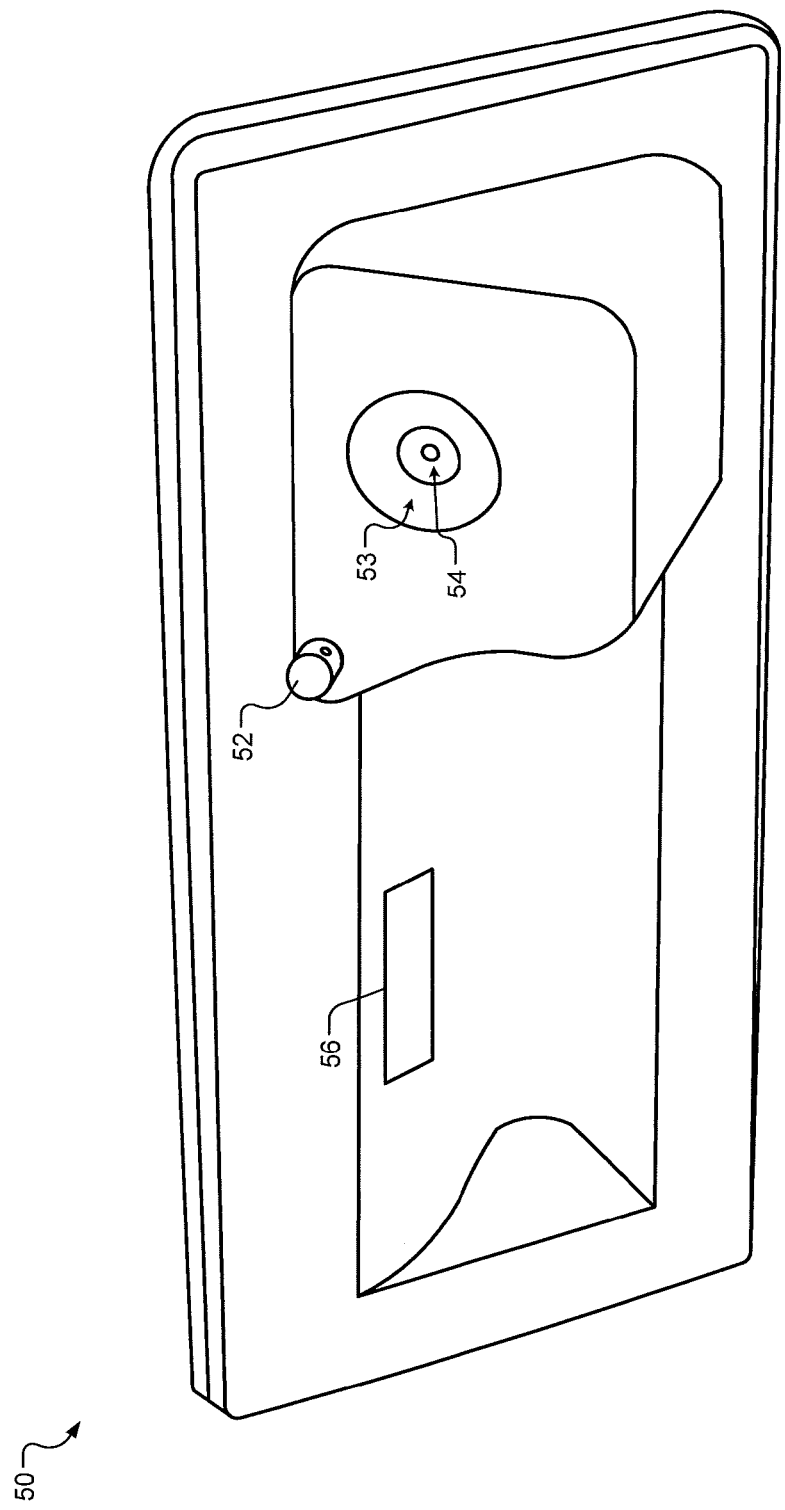
FIG. 1 is a perspective view illustrating a rear lift gate of a vehicle including a rear view camera, a washer nozzle and a lift gate release button.

Referring now to FIG. 1, a portion of a rear lift gate 50 of a vehicle is shown to include a rear view camera 53 that is arranged beneath a lens cover 54. A washer nozzle 52 selectively supplies cleaning fluid to clean debris from the lens cover 54 of the rear view camera 53. A lift gate release button 56 may include a mechanical or electrical switch for selectively latching or releasing a lift gate latch and actuating a lift motor during closing or opening of the rear lift gate 50.

Since the rear view camera 53 is exposed to the elements, dirt and other debris may collect on the lens cover 54. The washer nozzle 52 is used to periodically direct cleaning fluid such as washer fluid onto the lens cover 54. As can be appreciated, the washer nozzle 52, valves and fluid connections (both not shown) to the washer nozzle 52 increase the cost of the vehicle. In addition, vehicle owners may be dissatisfied when the washer nozzle 52 operates after the vehicle has recently been cleaned and makes the rear portion of the vehicle dirty.

Referring now to FIGS. 2A-2D, a camera cleaning system 70 includes a camera 74 and a cleaning arm assembly 84. In FIG. 2A, the camera 74 is shown in a first position. The cleaning arm assembly 84 is arranged out of a field of view 80 of the camera 74. In some examples, the camera 74 and/or the cleaning arm assembly 84 are moved into the first position during reverse operation of the vehicle. The camera 74 includes a lens cover 78. The camera 74 is attached to a motor and mount assembly 76 that attaches the camera 74 to the vehicle and selectively adjusts a position of the camera 74 using a motor as will be described further below. In some examples, the motor and mount assembly 76 includes gears, cams or other structures to position the arm and/or camera (all not shown).

The cleaning arm assembly 84 includes a cleaning material 86 that is attached to an arm 88. In some examples, the cleaning material 86 includes rubber, fabric, microfiber, chamois microfiber, a brush, a camel-haired brush, or other suitable cleaning material. The arm 88 is attached to the motor and mount assembly 76 that attaches the cleaning arm assembly 84 to the vehicle and selectively adjusts a position of the cleaning arm assembly 84 as will be described further below. In some examples, the motor and mount assembly 76 may be attached to a vehicle component 92.

In some examples, the camera 74 may be a rear view camera and the vehicle component 92 may be a lift gate. In other examples, the camera 74 is a side or front view camera and the motor and mount assembly 76 is attached to another vehicle component. In some examples, a hydrophobic coating 94 may be applied to the lens cover 78.

In FIGS. 2B-2D, the camera 74 is shown during movement from the first position in FIG. 2A to a second position shown in FIG. 2D. The second position corresponds to a stored or cleaning position. In some examples, the second position may be used during conditions other than reverse operation of the vehicle. For example for autonomous vehicles, the camera 74 may be moved to the second position when the engine is stopped (for vehicles with engines), when vehicle operation ends (for hybrid or electric vehicles), when the transmission is positioned in park, or using other criteria.

While a single motor is shown with the motor and mount assembly 76, individual motors may be associated with the camera 74 and the cleaning arm assembly 84 to position the camera 74 relative to the cleaning arm assembly 84. As can be seen in FIGS. 2B-2D, the cleaning material 86 is moved across the lens cover 78 during movement from the first position to the second position to clean the lens cover 78.

Figure 3A:
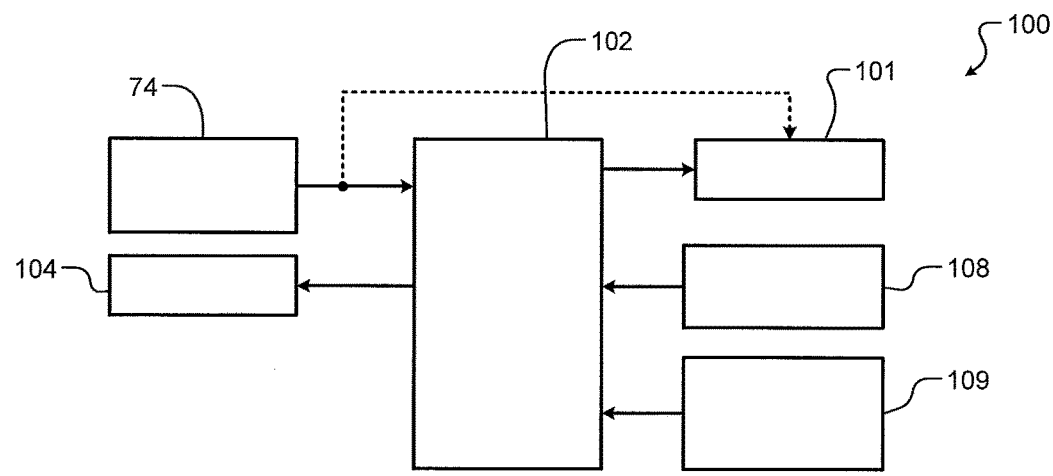
FIG. 3A is a functional block diagram of the cleaning system of FIGS. 2A-2D.

Referring now to FIG. 3A, a control system 100 for the camera cleaning system is shown. A control module 102 is configured to control a motor 104 in response to a camera deployment indicator 108. In some examples, the camera 74 is deployed in response to a key system 109 identifying a key FOB or smart phone in the vicinity of the vehicle. Once deployed, the camera 74 can be used for biometric or gesture identification as will be described further below.

In some examples, the camera deployment indicator 108 generates a camera deployment signal in response to a first predetermined event such as a reverse event, an engine start event, a vehicle operating event, a transmission selection event and/or other events. The motor 104 is associated with the motor and mount assembly 76. In some examples, the control module 102 may also be used to perform image processing of video signals output by the camera 74 before output to a display 101.

Figure 3B:
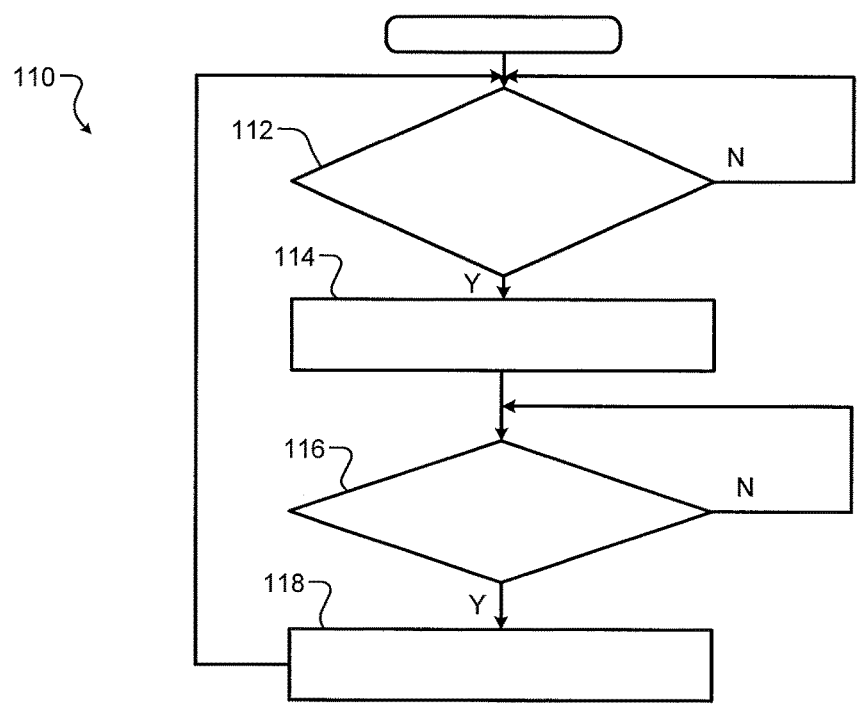
FIG. 3B is a flowchart illustrating a method for operating the camera cleaning system of FIGS. 2A-2D.

Referring now to FIG. 3B, a method 110 for operating the control system 100 is shown. At 112, the method determines whether the first predetermined event occurs such as a reverse event, an engine start event, a vehicle operating event, a transmission event or other event. If 112 is false, the method returns to 112. When 112 is true, the camera is moved to a first position such as the position shown in FIG. 2A. In the first position, the camera 74 can provide video signals to assist a driver during operation of the vehicle. At 116, the method determines whether a second predetermined event occurs. For example only, the second predetermined event may occur when the reverse event ends, the engine is turned off (e.g. ignition transitioned OFF), the vehicle is turned off, and/or the transmission is moved to park or other event. If 116 is false, the method continues at 116. When 116 is true, the camera is moved into the second position as shown in FIG. 2D.

Figure 4:
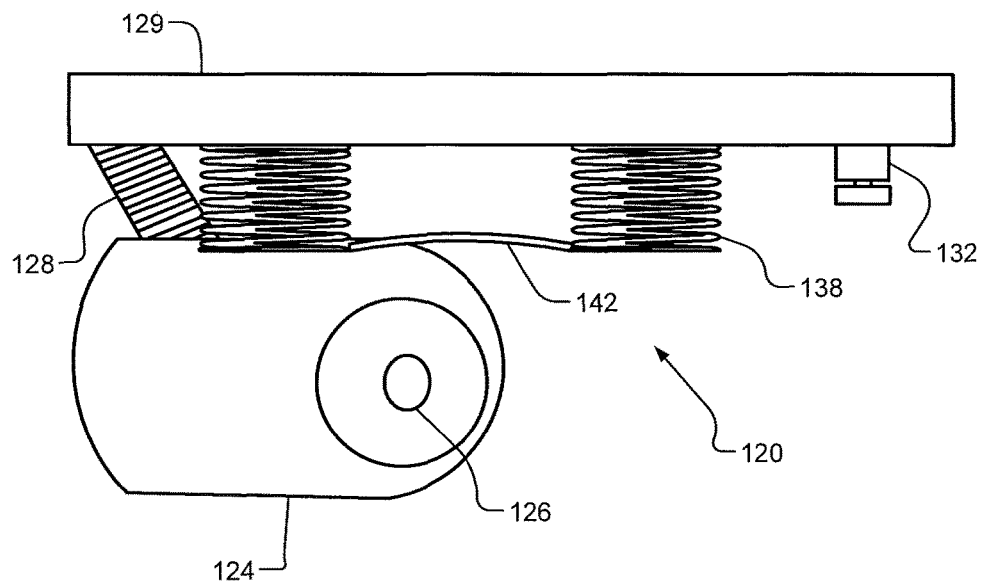
FIGS. 4-5 are perspective views illustrating an example of a camera and a spring-actuated cleaning system according to the present disclosure.
Figure 5:
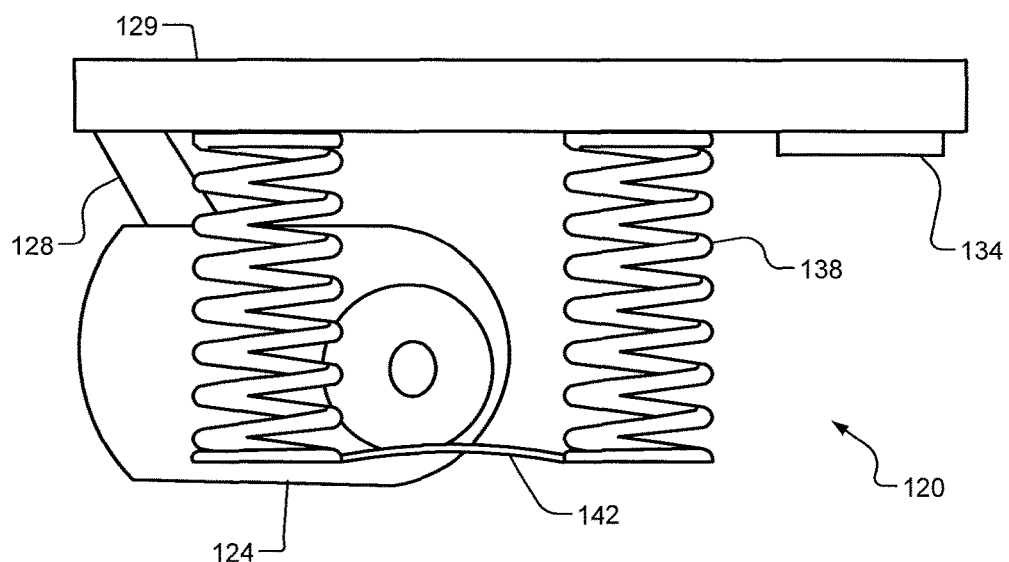

Referring now to FIGS. 4-5, a spring-actuated cleaning system 120 is shown to include a camera 124 having a lens cover 126. The camera 124 may be mounted by one or more fasteners and/or adhesive identified at 128 to a moveable vehicle component 129. In some examples, the moveable vehicle component 129 is moveable relative to other portions of the vehicle by a driver or passenger. For example, the moveable vehicle component 129 may include a door, trunk, lift gate, sliding door, or other component. First ends of springs 138 are attached to the moveable vehicle component 129.

A cleaning arm 142 is connected between second ends of the springs 138. In some examples, suitable fasteners (not shown) are used to connect opposite ends of the cleaning arm 142 to the springs 138. The cleaning arm 142 may be made of a cleaning material (or may include an arm having cleaning material arranged on at least one side thereof as shown in FIGS. 2-3).

In some examples, a mechanical release switch 132 for releasing the moveable vehicle component 129 is provided (as shown in FIG. 4) or an electronic release switch 134 for releasing the moveable vehicle component 129 is provided (as shown in FIG. 5), although other types of switches can be used. In some examples, gesture or biometric identification can be used to release the moveable vehicle component 129 instead of a switch. When the moveable vehicle component 129 is closed or opened during use, the springs 138 extend and then retract such that the cleaning arm 142 moves across the lens cover 126. The cleaning material comes into contact with and cleans the lens cover 126 of the camera 124 to remove debris therefrom.

Figure 6:
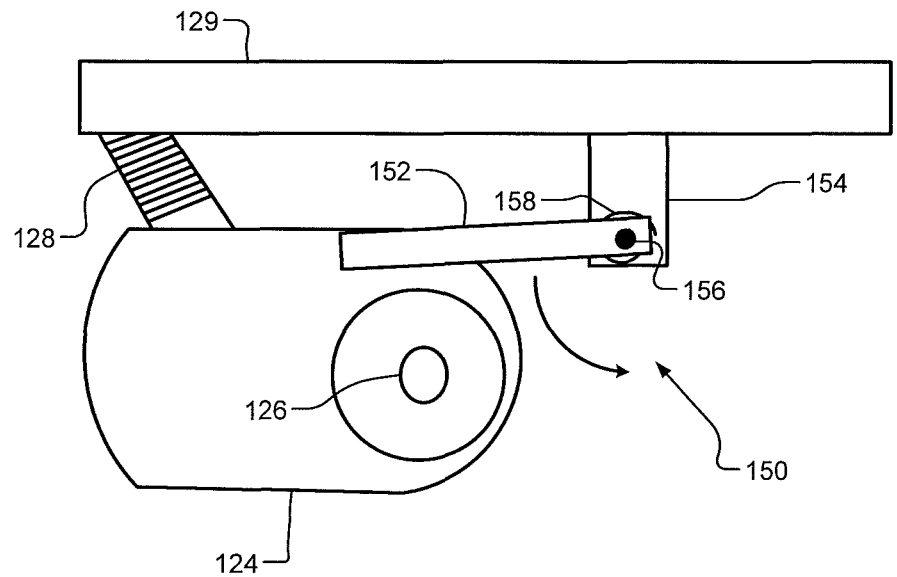
FIG. 6 is a perspective view illustrating an example of a camera and a spring-actuated cleaning arm according to the present disclosure.

Referring now to FIG. 6, a spring-actuated, mechanical cleaning system 150 is shown to include a cleaning arm 152. The cleaning arm 152 may be made of a cleaning material (or may include an arm having cleaning material arranged on at least one side thereof as in FIGS. 2-3). The spring-actuated cleaning arm 152 is mounted to and rotates about an axis 156. A spring 158 biases the cleaning arm 152 in a first direction into a first position. When the moveable vehicle component 129 is closed, the cleaning arm 152 rotates downwardly about the axis 156 and cleans the lens cover 126 of the camera 124 and then returns due to a bias of the spring 158 to the first position.

Figure 7:
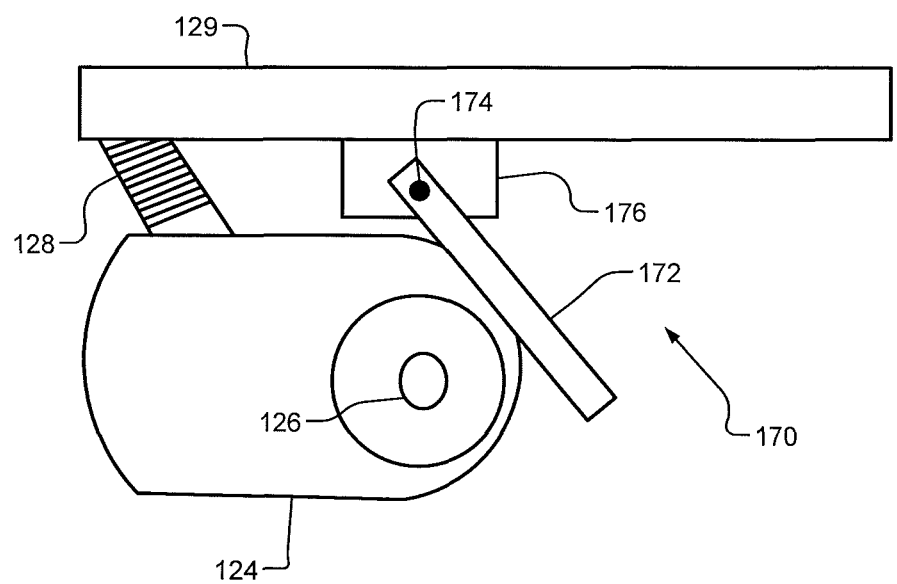
FIG. 7 are perspective views illustrating an example of a camera and a motor-actuated cleaning arm according to the present disclosure.

Referring now to FIG. 7, a motor-actuated cleaning system 170 is shown to include a cleaning arm 172. The cleaning arm 172 may be made of a cleaning material (or may include an arm having cleaning material arranged on at least one side thereof as in FIGS. 2-3). The cleaning arm 172 is mounted to and rotates about an axis 174. A motor 176 selectively moves the cleaning arm 172 back and forth relative to the camera to clean the lens cover 126 of the camera 124. In some examples, the motor is actuated by predetermined gestures or biometric characteristics of the user as will be described further below.

Figure 8:
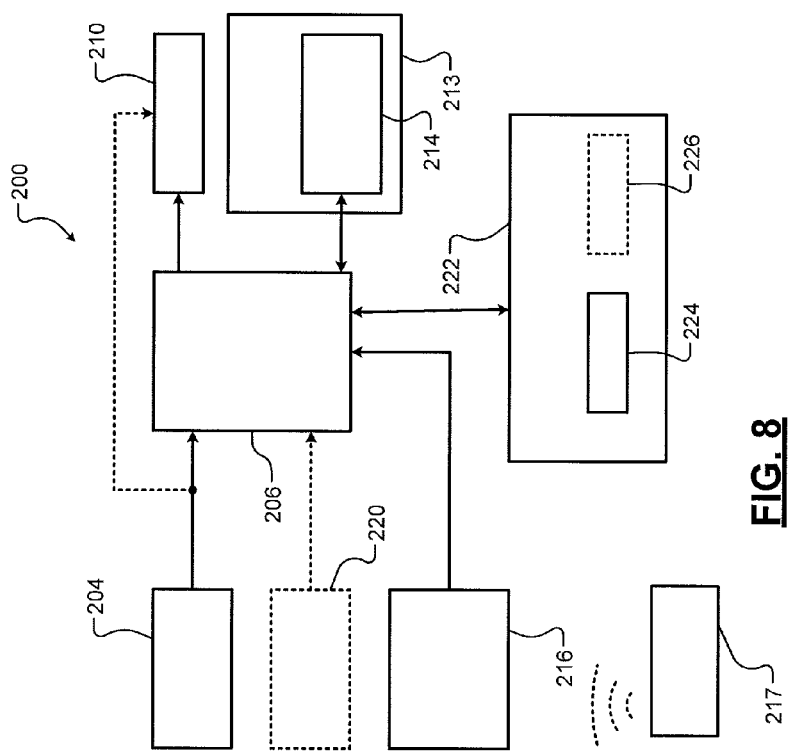
FIG. 8 is a functional block diagram illustrating an example of a control system for the camera cleaning system of FIG. 7.

Referring now to FIG. 8, a control system 200 for the camera cleaning system of FIG. 7 is shown. A camera 204 such as a front view camera, a side view camera or a rear view mirror camera is connected to a control module 206 and/or directly to a display 210. In some examples, the control module 206 may communicate with a video processing module 213 that performs video processing on the images received from the camera 204. For example, the video processing module 213 may add reverse steering guidelines, combine views from multiple cameras, or add other information to the video images.

The video processing module 213 may also include a gesture recognition module 214 that performs gesture recognition on images received from the camera 204 to identify the occurrence of one or more predetermined gestures. For example, the predetermined gestures may include a hand with a predetermined combination of fingers (or thumb) extended or predetermined movement of a hand or foot. The gesture recognition module 214 may require a repetitive learning mode similar to fingerprint identification found on smartphones.

A key authentication system 216 is used to wirelessly identify when a key FOB or smartphone 217 is in the vicinity of the vehicle. A latch motor release mechanism 222 including a latch 224 and an optional motor 226 selectively releases the latch 224 and opens the moveable vehicle component or closes the moveable vehicle component and engages the latch 224.

Figure 9:
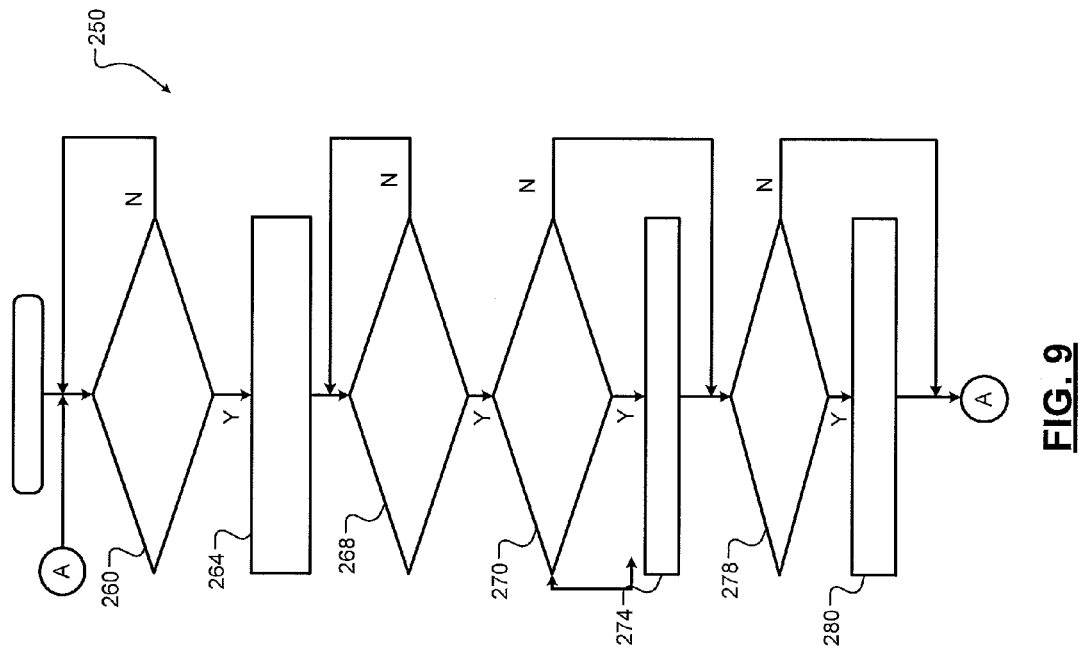
FIG. 9 is a flowchart illustrating an example of a method for operating the camera cleaning system of FIG. 8.

Referring now to FIG. 9, a method 250 for operating the camera cleaning system of FIG. 8 is shown. At 260, the camera cleaning system determines whether the key FOB or smartphone is within range of the vehicle. When 260 is true, the camera is powered ON and outputs video images. Gesture recognition is performed on the video images received from the camera. At 268, the method determines whether a predetermined gesture is recognized in the video images. When 268 is true, the method determines whether the gesture corresponds to a predetermined gesture for actuating the moveable vehicle component at 270. In some examples, the gesture recognition may require a training and feedback process to be performed by the user.

If 270 is true, the moveable vehicle component is actuated. The actuation can include opening or closing of the moveable vehicle component. The gestures also may be the same or different for closing or opening of the moveable vehicle component. For example, a hand with all of the index fingers extended and split into a "V"-shape may correspond to closing and a hand with the thumb and the last index finger extended may correspond to opening, although other gestures may be used.

The method continues from 270 (if false) and 274 with 278. At 278, the method determines whether the gesture in the video signal corresponds to the predetermined gesture for cleaning the camera (for motor-based cleaning). For example, a hand with the first fingers extended may correspond to camera cleaning. In another example, an open hand moving from left to right may be used to initiate camera cleaning. If 278 is true, the method actuates the camera cleaning. The method continues from 278 (if false) and 280 with 260.

Referring now to FIG. 10, another example of a control system for the camera cleaning system is shown. A camera 304 is connected to a control module 306 or directly to the display 310. In some examples, the control module 306 may output the video signals to a video processing module 313 that performs video processing on the images received from the camera 304. For example, the control module 306 may add reverse steering guidelines or other information to the images.

The video processing module 313 may also include a biometric recognition module 312 that performs biometric recognition and a gesture recognition module 315 that performs gesture recognition. Biometric recognition is used to identify one or more predetermined biometric features of a driver or occupant. The biometric recognition module 312 and the gesture recognition module 315 may require repetitive learning modes similar to fingerprint identification found on smartphones. A key authentication system 316 is used to wirelessly identify when a key FOB or smartphone 317 is in the vicinity of the vehicle. A latch motor release mechanism 322 including a latch 324 and an optional motor 326 selectively releases the latch 324 and opens the moveable vehicle component or closes the moveable vehicle component and engages the latch 324.

Referring now to FIG. 11, a method 350 for operating the camera cleaning system of FIG. 10 is shown. At 360, the camera cleaning system determines whether the key FOB or smartphone is within range of the vehicle. When 360 is true, the camera is powered and biometric recognition is performed based on the video signal received from the camera. At 368, the method determines whether a predetermined biometric feature is recognized in the video images. When 368 is true, the method determines whether a biometric feature identified in the video images corresponds to a predetermined biometric feature for actuating the moveable vehicle component at 370. If 370 is true, the moveable vehicle component is actuated. The actuation can include opening, closing or other actuation of the moveable vehicle component. The biometric feature can correspond to a palm, a fingerprint, eye or other biometric characteristic of an occupant.

The method continues from 370 (if false) and 374 with 378. At 378, the method determines whether a biometric feature or gesture in the video signal corresponds to a gesture for cleaning the camera. If 378 is true, the method actuates the camera cleaning. The method continues from 378 (if false) and 380 with 360.

Figure 12A:
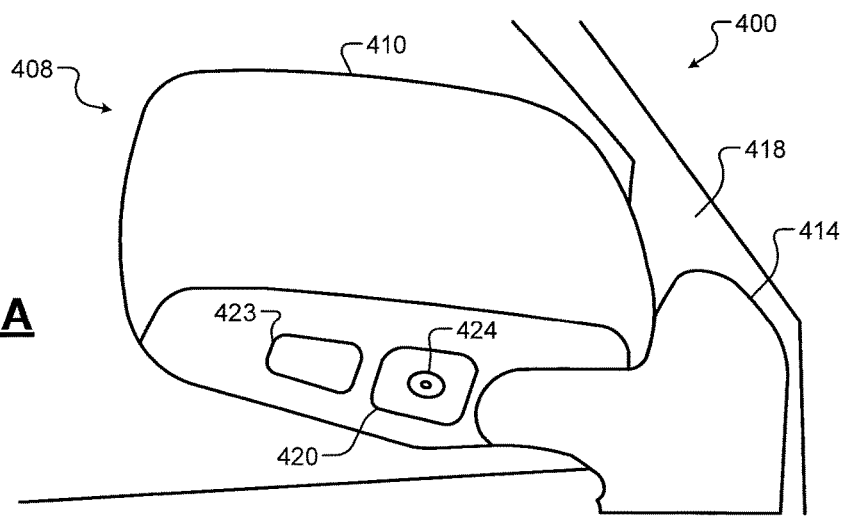
FIGS. 12A-12C are perspective and side cross-sectional views of a sliding assembly for cleaning a camera associated with a side view mirror.
Figure 12B:
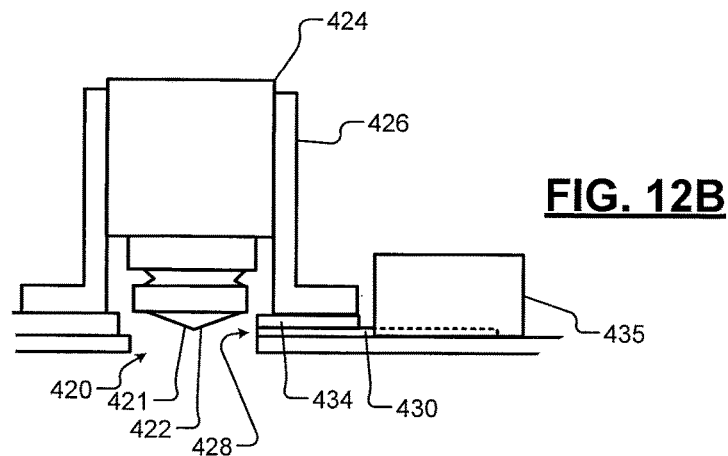
Figure 12C:
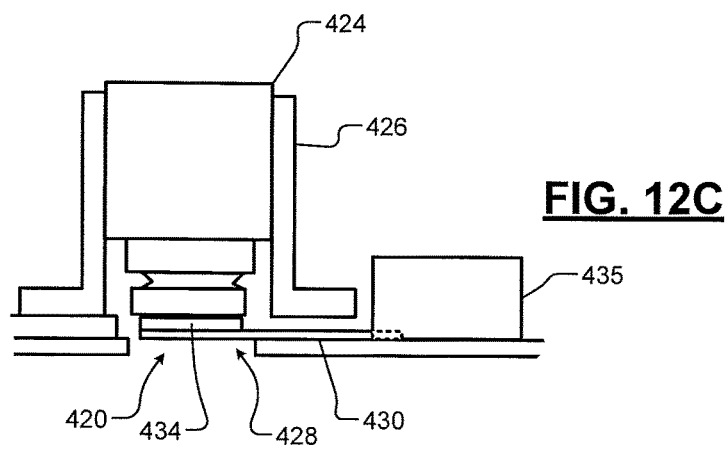

Referring now to FIGS. 12A-12C, a system 400 for cleaning a camera 424 associated with a first opening 420 in a vehicle component 408 is shown. In some examples, the vehicle component may include a side view mirror, a front or rear bumper, a passenger door, or other exterior vehicle panel. In some examples, the vehicle component 408 (such as the side view mirror) may also include a downwardly directed light 423 to assist a driver or passenger in low light conditions.

In FIG. 12A, the vehicle component 408 is shown to include a housing 410 that is connected by a mirror mount 414 to a window frame 418 or door. In other applications, the housing 410 includes a portion of the front or rear bumper, the passenger door, or other exterior vehicle panel. The camera 424 includes a lens cover 421 that is exposed in the first opening 420 during some operating conditions described below. A hydrophobic coating 422 may be applied to an outwardly-facing surface of the lens cover 421.

A cleaning assembly 428 includes an arm 430 with a cleaning material 434 and is slidably received in a slot defined at least in part by the housing 410 or other structure of the mirror assembly. A motor 435 may be used to move the cleaning arm 430 and the cleaning material 434 in the slot to a first position that does not obstruct the camera 74. In some examples, the camera 424 and/or the motor 435 are mounted to the housing 410 or other structure by a mounting portion 426. When the motor 435 moves the cleaning arm 430 and the cleaning material 434 to a second position, the cleaning material 434 cleans the lens cover 421 to remove debris or protect the lens cover while the vehicle is not in use or the camera is not required.

In some examples, the cleaning arm 430 is operated as in FIG. 3B. In other words, the cleaning arm 430 is moved to the first position in response to a first predetermined event occurring (such as a reverse event, an engine start event, a vehicle operating event, a transmission event, a key FOB or smartphone identification event or other event). The cleaning arm 430 is moved to the second position in response to a second predetermined event occurring (such as the reverse event ends, an engine off event, a vehicle OFF event, a transmission event (such as a park event), or other event). Alternately, the cleaning arm 430 may be arranged in the second position whenever the vehicle is not operating and then moved to the first position during operation of the vehicle. In other examples, the cleaning arm 430 may be arranged in the first position whenever the vehicle is not operating and then cycled from the first position to the second position and back to the first position when the vehicle is unlocked. In still other examples, the cleaning arm may be cycled between the first and second positions on a periodic basis or an event basis.

In some examples, biometric and/or gesture identification can be performed to clean the camera 424 or open a door corresponding to the side view mirror as described above. In some examples, the camera 424 is turned on when the key FOB corresponding to the vehicle is sensed by the vehicle within a predetermined distance of the vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalitalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A camera cleaning system for a vehicle, comprising:
a camera including a lens cover;
a motor mounted to the vehicle; and
a cleaning assembly comprising an arm including a cleaning material,
wherein the motor selectively rotates (1) a position of the arm relative to the camera from a first position to a second position and (2) a position of the camera relative to the arm from a first position to a second position,
wherein the lens cover is at least partially exposed when the camera is in the first position, and
wherein the cleaning assembly is in contact with the lens cover when the camera is in the second position and the arm is in the second position.

2. The camera cleaning system of claim 1, wherein the motor moves the cleaning material across the lens cover as the camera and the cleaning assembly are moved from the first position to the second position.

3. The camera cleaning system of claim 2, wherein the cleaning material is arranged in contact with the lens cover when the camera is located in the second position.

4. The camera cleaning system of claim 2, wherein a field of view of the camera is unobstructed when the camera is in the first position.

5. A vehicle comprising:
the camera cleaning system of claim 2;
a key authentication system; and
a control module that selectively moves the camera from the second position to the first position in response to the key authentication system sensing a key fob or smartphone that is paired with the vehicle.

6. The camera cleaning system of claim 1, wherein the motor is attached to a vehicle component selected from a group consisting a door, a side mirror, a trunk and a lift gate of a vehicle.

7. The camera cleaning system of claim 6, further comprising a video processing module that performs video processing of video images from the camera and that selectively actuates the motor based on the video processing.

8. The camera cleaning system of claim 7, wherein the video processing module performs gesture identification to determine whether the video images include a predetermined gesture and at least one of:
selectively actuates the motor based on a result of the gesture identification; and/or
selectively opens or closes the vehicle component based on a result of the gesture identification.

9. The camera cleaning system of claim 7, wherein the video processing module performs biometric identification to determine whether the video images include a predetermined biometric characteristic and at least one of:
selectively actuates the motor based on a result of the biometric identification; and/or
selectively opens or closes the vehicle component based on a result of the biometric identification.

10. The camera cleaning system of claim 1, wherein the lens cover includes a hydrophobic coating.

11. The camera cleaning system of claim 1, wherein the motor selectively rotates the position of the arm and the position of the camera at the same time.

12. The camera cleaning system of claim 1, wherein the motor selectively rotates (1) the position of the arm along a first axis relative to the vehicle and a second axis relative to the vehicle and (2) the position of the camera along the first axis relative to the vehicle and the second axis relative to the vehicle.

* * * * *